United States Patent
Kitano et al.

(10) Patent No.: US 6,241,912 B1
(45) Date of Patent: Jun. 5, 2001

(54) SHEET METAL DEFORMATION BRIGHTENER COMPOSITION

(75) Inventors: Yasuhiko Kitano; Akira Kodama; Hiroya Miyaoka; Hiroshi Hata, all of Saitama; Naoki Kobayashi, Tokyo; Hisami Sasaki, Kanagawa, all of (JP)

(73) Assignees: Honda Giken Kogyo Kabushiki Kaisha; Lion Corporation, both of Tokyo (JP)

( * ) Notice: Subject to any disclaimer, the term of this patent is extended or adjusted under 35 U.S.C. 154(b) by 0 days.

(21) Appl. No.: 08/959,415

(22) Filed: Oct. 28, 1997

(30) Foreign Application Priority Data

Nov. 18, 1996 (JP) .................................................. 8-306721
Jan. 30, 1997 (JP) .................................................. 9-017179

(51) Int. Cl.$^7$ .................................................. G01N 31/00
(52) U.S. Cl. .................................................. 252/408.1; 356/237
(58) Field of Search .................................................. 252/408.1; 356/237

(56) References Cited

U.S. PATENT DOCUMENTS 3,992,319 * 11/1976 Alburger .................................................. 252/408
4,629,319 * 12/1986 Clarke et al. .................................................. 356/237

FOREIGN PATENT DOCUMENTS

| 48-7986 | 3/1973 | (JP) . |
| 53-126980 | 11/1978 | (JP) . |
| 54-81181 | 6/1979 | (JP) . |
| 3-175000 | 7/1991 | (JP) . |
| 05125395 | * 5/1993 | (JP) . |
| 08337797 | * 12/1996 | (JP) . |

OTHER PUBLICATIONS

Feb. 1998, Search Report from UK Patent Office.

* cited by examiner

Primary Examiner—David A. Redding
(74) Attorney, Agent, or Firm—Merchant & Gould P.C.

(57) ABSTRACT

An aqueous deformation-detecting brightener composition that can easily detect deformation such as unevenness on the surface of a car body by forming a liquid thin film having low foaming property and excellent glossiness is provided by dissolving a glycol ether compound expressed by the following formula (I) and a surfactant in water $$R^1-O-(AO)_m-R^2 \qquad (I)$$

where "$R^1$" represents an alkyl group having 1 to 9 carbon atoms, an alkenyl group having 1 to 9 carbon atoms, an alkylphenyl group having 1 to 9 carbon atoms, or a functional group expressed by the following general formula (II), "A" represents an alkylene group having 2 to 4 carbon atoms, "m" represents an average adduct molar number of alkylene oxide, a number of 1 to 20, in which the same alkylene oxide may be added alone, or a mixture of two or more types of alkylene oxide may be added, and "$R^2$" represents an alkyl group having 1 to 9 carbon atoms, an alkenyl group having 1 to 9 carbon atoms, or hydrogen $$Ph-(CH_2)_n- \qquad (II)$$

where "Ph" represents a phenyl group, and "n" represents an integer of 0 to 3.

16 Claims, 2 Drawing Sheets

FIG. 1

| | Examples of present invention | | | | | | | | | | | | ***** | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| * $C_4H_9O(EO)_2H$ | 3 | | | | | | | | | | | | 5 | |
| $C_4H_9O(EO)_1(PO)_2H$ | | 3 | | | | | | | | | | | | |
| Phenol $(EO)_1H$ | | | 3 | | | | | | | | | | | |
| $BzO(EO)_1H$ | | | | 5 | 5 | 5 | | | 5 | | 10 | 30 | | |
| $BzO(EO)_2H$ | | | | | | | 7 | 7 | | | | | | |
| $C_2H_5O(EO)_2C_2H_5$ | | | | | | | | | | 3 | | | | |
| ** Nonyl phenol $(EO)_9H$ | 8 | 5 | 5 | | | | | | | 5 | | | | 5 |
| Lauryl alcohol $(EO)_7H$ | | | | 5 | | | | | | | | | | |
| $C_{12-14}$ secondary alcohol $(EO)_7H$ | | | | | 5 | | | | | 5 | 10 | 20 | | |
| $C_{12-14}$ secondary alcohol $(EO)_{15}H$ | | | | | | 5 | | | | | | | | |
| $C_{12-15}$ alcohol $(EO)_3$ sodium sulfate | | | | | | | | 3 | | | | | | |
| Dioctyl sodium sulfosuccinate | | | | | | | | | 3 | | | | | |
| *** Sodium benzoate | | 3 | 3 | | 0.5 | 1 | | 1 | 0.5 | | 3 | 2 | 3 | |
| Diethanolamine benzoate | | | | | | | | | | 1 | | | | |
| $C_{12-14}$ dialkylamine | | | | 0.5 | | | | | | | | | | |
| Propylene glycol | | | | 5 | 9 | | | 5 | | | | | | |
| Glycerol | | | | | | | | | | 9 | | | | |
| **** Glossiness | ○ | ○ | ◎ | ○ | ◎ | ◎ | ◎ | ◎ | ◎ | ◎ | ◎ | ◎ | × | △ |
| Glossiness (60° gloss) | 62 | 61 | 66 | 62 | 69 | 64 | 63 | 65 | 69 | 68 | 71 | 72 | 12 | 50 |
| Foam volume | ○ | ○ | ○ | ◎ | ◎ | ○ | ○ | ○ | ◎ | ○ | ○ | ○ | ○ | × |
| Foam height (mm) | 8 | 6 | 8 | 3 | 4 | 6 | 7 | 8 | 2 | 6 | 8 | 10 | 5 | 30 |
| Smoothness in coating | ○ | ○ | ◎ | ◎ | ◎ | ○ | ○ | ◎ | ◎ | ○ | ○ | ○ | △ | △ |
| Alkaline degreasing property | ◎ | ◎ | ◎ | ○ | ◎ | ○ | ○ | ○ | ◎ | ○ | ○ | ○ | ○ | ○ |
| Chemical conversion treatment property | ○ | ○ | ○ | ○ | ◎ | ○ | ○ | ○ | ◎ | ○ | ○ | ○ | × | × |

\* components (a)

\*\* components (b)

\*\*\* other components

\*\*\*\* evaluation results

\*\*\*\*\* comparative examples

FIG. 2

| | | ***** | | | | |
|---|---|---|---|---|---|---|
| | | 15 | 16 | 17 | 18 | 19 |
| * | $C_4H_9O(EO)_2H$ | | | | | |
| | $C_4H_9O(EO)_1(PO)_2H$ | | | | | |
| | Phenol $(EO)_1H$ | | | | | |
| | $BzO(EO)_1H$ | 5 | 5 | 5 | 5 | |
| | $BzO(EO)_2H$ | | | | | 5 |
| | $C_2H_5O(EO)_2C_2H_5$ | | | | | |
| ** | Nonyl phenol $(EO)_9H$ | | | | | |
| | Lauryl alcohol $(EO)_7H$ | | | | | |
| | $C_{12-14}$ secondary alcohol $(EO)_3H$ | 4 | 4 | | 3 | |
| | $C_{12-14}$ secondary alcohol $(EO)_7H$ | | 3 | 3 | | |
| | $C_{12-14}$ secondary alcohol $(EO)_{15}H$ | | | | 5 | |
| | $C_{12-14}$ secondary alcohol $(EO)_{30}H$ | 3 | 3 | | 3 | |
| | $C_{12-14}$ amine $(EO)_5H$ | | 5 | 5 | | 5 |
| | $C_{12-15}$ alcohol $(EO)_3$ sodium sulfate | | | | | |
| | Dioctyl sodium sulfosuccinate | | | | | |
| *** | Sodium benzoate | | | | 0.5 | |
| | Diethanolamine benzoate | | | | | |
| | $C_{12-14}$ dialkylamine | | | | | |
| | Propylene glycol | 5 | 7 | 9 | 5 | 5 |
| | Glycerol | | | | | |
| **** | Glossiness | ◎ | ◎ | ◎ | ◎ | ◎ |
| | Glossiness (60° gloss) | 68 | 70 | 68 | 71 | 65 |
| | Foam volume | ◎ | ◎ | ○ | ◎ | ○ |
| | Foam height | 3 | 3 | 5 | 4 | 5 |
| | Smoothness in coating | ◎ | ◎ | ◎ | ◎ | ○ |
| | Alkaline degreasing property | ◎ | ◎ | ◎ | ◎ | ○ |
| | Chemical conversion treatment property | ○ | ◎ | ◎ | ○ | ○ |

\* components (a)

\*\* components (b)

\*\*\* other components

\*\*\*\* evaluation results

\*\*\*\*\* comparative examples

SHEET METAL DEFORMATION BRIGHTENER COMPOSITION

BACKGROUND OF THE INVENTION

1. Field of the Invention

The present invention relates to a deformation detecting agent composition that can easily detect sheet metal deformation (hereinafter deformation), especially deformation such as unevenness on the surface of a car body. It relates to a sheet metal deformation brightener composition that can easily detect deformation before surface treatment to permit correction so that efficient operation can be achieved due to a significant decrease in man-hours, and the factors of degradation in the corrosion resistance due to the deformation can be eliminated.

2. Description of the Prior Art

In pressed products such as sheet metal products manufactured by pressing, a deformation such as an unevenness, recess, protrusion, or distortion can be produced on their surfaces by inadvertent mishandlling. Such deformation on the surface of a product may cause serious problems in subsequent processes. For example, deformation in a sheet metal product will be noticeable after the product is coated in a subsequent process, so that a risk that the coated products cannot be used may arise. Therefore, these products must be subjected to an inspection process before the next manufacturing process.

In the inspection process, detecting deformation by scanning the surface of a product with a light beam and treating its reflected light has been proposed. In this case, if the surface of the product is not glossy or it has a remarkably low reflection efficiency, a surface suitable for the treatment cannot be obtained, and therefore the accuracy of the deformation detection may be reduced.

Then, a prior art that can solve the above problems has proposed preventing the diffuse reflection of light by coating the surface of a product with an oily liquid comprising a glossy oil (Publication of Japanese Unexamined Patent Application No. Hei 3-175000). Another prior art has proposed coating with a highly volatile liquid instead of the oily liquid so that the liquid does not remain in treatment in subsequent processes (Publication of Japanese Examined Patent Application No. Sho 48-7986).

In order to form a uniform glossy surface using the oily liquid comprising a glossy oil, it is preferable to use an electrostatic coating method, for example. However, the oily liquid is conductive, so that an insulation treatment is required for an electrostatic coating apparatus. Therefore, this method is very expensive. Highly volatile liquids such as alcohol and trichloroethylene are non-conductive, so that they do not require the insulation treatment. However, they are combustible and harmful, so that considerable care is required to use them.

SUMMARY OF THE INVENTION

It is an object of the present invention to provide an aqueous deformation-detecting brightener composition that can easily detect deformation such as unevenness on the surface of a car body.

In order to solve the above problems, aqueous deformation-detecting brighteners were examined to find that a liquid thin film having low foaming property and excellent glossiness is formed by using a glycol ether compound and a surfactant, leading to the present invention.

The aqueous sheet metal deformation brightener composition of the present invention comprises the following main components (a) and (b):

(a) a compound expressed by the following general formula (I)

$$R^1-O-(AO)_m-R^2 \tag{I}$$

where "$R^1$" represents an alkyl group having 1 to 9 carbon atoms, an alkenyl group having 2 to 9 carbon atoms, an alkylphenyl group having 1 to 9 carbon atoms, or a functional group expressed by the following general formula (II), "A" represents an alkylene group having 2 to 4 carbon atoms, "m" represents an average adduct molar number of alkylene oxide, a number of 1 to 20, in which the same alkylene oxide may be added alone, or a mixture of two or more types of alkylene oxide may be added, and "$R^2$" represents an alkyl group having 1 to 9 carbon atoms, an alkenyl group having 1 to 9 carbon atoms, or hydrogen $$Ph-(CH_2)_n- \tag{II}$$

where "Ph" represents a phenyl group, and "n" represents an integer of 0 to 3;

(b) a surfactant.

The component (a) used in the present invention, the compound expressed by the general formula (I), is a glycol monoether or glycol diether.

Examples of glycol monoethers having the general formula (I) include ethylene glycol monomethyl ether, diethylene glycol monomethyl ether, triethylene glycol monomethyl ether, ethylene glycol monopropyl ether, diethylene glycol monopropyl ether, triethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol mono-2-ethyl hexyl ether, diethylene glycol mono-2-ethyl hexyl ether, ethylene glycol monophenyl ether, diethylene glycol monophenyl ether, triethylene glycol monophenyl ether, ethylene glycol monobenzyl ether, diethylene glycol monobenzyl ether, and triethylene glycol monobenzyl ether.

Examples of glycol diethers include ethylene glycol dimethyl ether, ethylene glycol diethyl ether, and ethylene glycol dibutyl ether.

These compounds may be used individually or as a mixture of two or more types.

Among the glycol ether compounds having the general formula (I), those having 4 or more carbon atoms in total for the end ether residual groups (the carbon atoms of "$R^1+R^2$") are preferably used. Also, the glycol portion is preferably formed by addition of ethylene oxide or propylene oxide. Its adduct molar number "m" is preferably 1 to 4.

Nonionic surfactants, anionic surfactants, cationic surfactants or amphoteric surfactants can be used as the surfactant of the component (b). However, nonionic surfactants or anionic surfactants are preferably used.

Examples of the nonionic surfactants include the following compounds. Here, "p" represents an average adduct molar number of alkylene oxide. Ethylene oxide, propylene oxide, butylene oxide, or a mixed adduct thereof is used as the alkylene oxide. (1) polyoxyalkylene (p=1 to 40) alkyl or alkenyl ($C_{10}$ to $C_{22}$) ether, preferably p=3 to 40;

(2) polyoxyalkylene (p=1 to 40) alkyl or alkenyl ($C_{10}$ to $C_{22}$) phenyl ether, preferably p=3 to 40;

(3) polyoxyalkylene (p=0.5 to 40) alkyl or alkenyl ($C_{10}$ to $C_{22}$) amine, preferably p=2 to 20;

(4) polyoxyalkylene (p=0.5 to 50) alkyl or alkenyl ($C_{10}$ to $C_{22}$) amide, preferably p=3 to 50, more preferably p=2 to 20;

(5) ethylene oxide/propylene oxide block adduct (a Pluronic type surfactant).

Among the above nonionic surfactants, those having the following general formula (III) are most preferable for the present invention

$$R^3\text{—}O\text{—}(AO)_p\text{—}H \quad (III)$$

where "$R^3$" represents an alkyl group, an alkenyl group, a phenyl group, or an alkylphenyl group, each of which has 10 to 22 carbon atoms, "A" represents an alkylene group having 2 to 4 carbon atoms, and "p", the average adduct molar number of alkylene oxide, represents a number of 1 to 40, preferably 3 to 30, in which the same alkylene oxide may be added alone, or a mixture of two or more types of alkylene oxide may be added.

These surfactants may be used individually or as a suitable combination of two or more types. The preferable combination is the combination of a nonionic surfactant expressed by the general formula (III) and polyoxyalkylene alkyl or alkenyl amine or amide. Their ratio is preferably the nonionic surfactant expressed by the general formula (III) /amine or amide=9/1 to 1/9 (by weight).

Examples of the anionic surfactants include the following compounds:

(1) straight chain alkylbenzenesulfonate having an alkyl group of 8 to 16 carbon atoms on average;

(2) alpha olefin sulfonate having 10 to 20 carbon atoms on average;

(3) dialkyl sulfosuccinic acid having an alkyl group having 4 to 10 carbon atoms or an alkenyl group having 4 to 10 carbon atoms;

(4) fatty acid lower alkyl ester sulfonate expressed by the following general formula (IV) or a sulfonated fatty acid compound

$$R^4\text{—}\underset{\underset{SO_3Z}{|}}{C}HCOOY \quad (IV)$$

where "$R^4$" represents an alkyl group having 8 to 20 carbon atoms or an alkenyl group having 8 to 20 carbon atoms, "Y" represents an alkyl group having 1 to 3 carbon atoms or an ion selected from the group consisting of alkaline metal and alkanolamine salt, and "Z" represents an ion selected from the group consisting of alkaline metal and alkanolamine salt;

(5) alkyl sulfate having 10 to 20 carbon atoms on average;

(6) alkyl ether sulfate having a straight chain or branched chain alkyl group or alkenyl group having 10 to 20 carbon atoms on average, to which 0.5 to 8 mole ethylene oxide on average is added;

(7) saturated or unsaturated fatty acid salt having 10 to 22 carbon atoms on average.

An alkaline metal such as sodium or potassium, or an alkanolamine salt such as monoethanolamine or diethanolamine is used as an ion in these anionic surfactants.

These anionic surfactants may be used individually or as a suitable combination of two or more types.

The ratio of the above component (a) to the component (b) is 1/8 to 8/1 by weight, preferably 1/5 to 5/1, and 1 to 80 wt. %, preferably 5 to 50 wt. % can be contained in total. Water is added as the remaining component.

In the sheet metal deformation brightener composition of the present invention, a rust preventative as a component (c) is mixed with the above components (a) and (b) in the range of 0.01 to 10 wt. %, preferably 0.05 to 3 wt. %, so that rust prevention can be improved with respect to iron-containing plates.

Examples of the rust preventives of the component (c) include known rust preventives, for example, carboxylic acids and carboxylates such as oleic acid and its salts or esters, and benzoic acid and its salts or esters, amines such as dialkylamine, monophosphates such as polyoxyethylene dodecyl alcohol phosphate and polyoxyethylene nonyl phenol phosphate, dicyclohexylamine nitrite, and sodium nitrite.

In the sheet metal deformation brightener composition of the present invention, a hydrotropic agent, for example, glycols such as ethylene glycol and propylene glycol, toluenesulfonate, or xylenesulfonate may be added as well as the above components to retain liquid stability, or gelatin or soluble polymers may be added.

When using this agent inline (on the production line), the surface of a sheet metal product is manually or automatically coated with this agent to determine the deformation condition of the surface. Then the information is visually sent to workers in subsequent processes in real time, so that the deformation of the sheet metal product can be corrected inline, permitting the inline assurance of the production line.

Furthermore, continuous deformation can be discovered earlier. If the deformation condition is fedback to upstream processes, the precision of the sheet metal product can be further improved.

When using this agent offline (outside of the production line), a prototype sheet metal is coated with this agent. The deformation condition of its surface is sampled to be determined so that it can be used for back data collection for analyzing its cause and knowing more about sheet metal products.

BRIEF DESCRIPTION OF THE FIGURES

FIG. 1 is a table containing compositions and performance characteristics for Examples 1–14.

FIG. 2 is a table containing compositions and performance characteristics for Examples 15–19.

DETAILED DESCRIPTION OF THE INVENTION

The present invention will be described below in further detail by way of examples. However, the present invention is not intended to be limited to these examples.

Sheet metal deformation brightener compositions having composition shown in FIGS. 1 and 2 were prepared. The performance of the obtained brighteners was evaluated by the following methods. The amounts for mixing are represented by wt. %. The amounts being short of were adjusted with ion exchange water.

Evaluation Method

1. Glossiness

A galvanized alloy sheet metal (150 mm×70 mm×1 mm) was coated with each sample using a sponge. A glossmeter (GM-268 manufactured by MINOLTA CO., LTD.) was used to determine glossiness.

The glossiness was evaluated according to the following standard. ○ or better was accepted.

◎: reflecting well
○: reflecting
Δ: reflecting a little
X: reflecting little

2. Foam Volume and Foam Height (1) Foam Volume

Coating with each sample was similarly performed as in the evaluation of glossiness. The foam volume on the surfaces of sheet metals was evaluated. The result was determined according to the following standard. ○ or better was accepted.

◎: very low foaming
○: low foaming
Δ: high foaming
X: very high foaming (2) Foam Height For the height of foam, 10 ml of each sample was put in an Epton tube having a capacity of 100 ml, shaken three times, and allowed to stand still for two minutes. Then, the height of the foam was measured.

3. Smoothness in Coating

Coating with each sample was similarly performed as in the evaluation of glossiness using a sponge. The easiness of coating (smoothness) at the time was sensorially evaluated.

The result was determined according to the following standard. ○ or better was accepted.

◎: very smooth
○: smooth
Δ: less smooth
X: far less smooth

4. Alkaline Degreasing Property

A galvanized alloy sheet metal (150 mm×70 mm×1 mm) was immersed in each sample, pulled up, and vertically suspended to be left for three days. An alkaline degreasing agent (in which 0.08 wt. % or less of sodium, 0.045 wt. % or less of phosphate, 0.04 wt. % or less of carbonate, 0.01 wt. % or less of borate, 0.01 wt. % or less of nitrite, and 0.045 wt. % or less of surfactant were dissolved in water) was heated to 45° C. The sheet metal was immersed in the solution for two minutes while stirring it, then immediately put in tap water overflowing, and rocked for 30 seconds. Immediately after pulling the sheet metal up, the water-wetted area ratio of the sheet metal was visually determined.

The alkaline degreasing property was evaluated to the following standard.

○ or better was accepted.
◎: a water-wetted area ratio of 95 to 100%
○: a water-wetted area ratio of 90 to 95%
Δ: a water-wetted area ratio of 50 to 90%
X : a water-wetted area ratio of 50% or less 5. Chemical Conversion Treatment Property Sheet metals previously alkaline degreased (150 mm×70 mm×1 mm) were continuously subjected to chemical conversion treatment. A chemical conversion treatment agent (in which 0.08 wt. % or less of sodium, 2 wt. % or less of phosphate, 0.015 wt. % or less of zinc, 0.01 wt. % or less of chlorate, 0.015 wt. % or less of nickel, 0.01 wt. % or less of manganese, 2 wt. % or less of nitrate, and 0.1 wt. % or less of nitrite were dissolved in water) was heated to 40 to 50° C. The sheet metals were immersed in the solution for two minutes while stirring it, then immediately washed with tap water at room temperature, and dried.

The surfaces of the sheet metals were observed with an electron microscope. The crystalline state per unit area was evaluated according to the following standard. ○ or better was accepted.

◎: heterogeneity in crystalline state is 0 to 5%
○: heterogeneity in crystalline state is 5 to 10%
Δ: heterogeneity in crystalline state is 10 to 15%
X : heterogeneity in crystalline state is 15% or more As is apparent from FIGS. 1 and 2, Examples Nos. 1–12 and Nos. 15–19 of the present invention had high glossiness, preferable foam volume, preferable smoothness in coating, preferable alkaline degreasing property, and a preferable chemical conversion property because they comprise the component (a), glycol ether compounds expressed by the general formula (I), and the component (b), surfactants, as the essential components. On the other hand, Comparative Example No. 13 had poor glossiness and chemical conversion property, and unfavorable smoothness in coating because it does not comprise the component (b). Also, Comparative Example No. 14 had poor foam volume, poor chemical conversion property, unfavorable glossiness, and unfavorable smoothness in coating.

As mentioned above, the deformation detecting brightener composition of the present invention can provide a liquid thin film having low foaming property and excellent glossiness by using a glycol ether compound expressed by the general formula (I) and a surfactant. Also, the deformation detecting brightener composition of the present invention can implement a liquid thin film having excellent smoothness in coating, excellent alkaline degreasing property, and excellent chemical conversion property.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An aqueous sheet metal deformation brightener composition comprising a compound (a) expressed by the following general formula (I) and a surfactant (b)

$$R^1-O-(AO)_m-R^2 \qquad (I)$$

where $R^1$ represents an alkyl group having 1 to 9 carbon atoms, an alkenyl group having 2 to 9 carbon atoms, an alkylphenyl group having 1 to 9 carbon atoms in the alkyl group, or a functional group expressed by the following general formula (II), A represents an alkylene group having 2 to 4 carbon atoms, m represents an average adduct molar number of alkylene oxide, a number of 1 to 20, in which the same alkylene oxide may be added alone, or in a mixture of two or more types of alkylene oxide may be added, and $R^2$ represents an alkyl group having 1 to 9 carbon atoms, an alkenyl group having 2 to 9 carbon atoms, or hydrogen $$Ph-(CH_2)_n- \qquad (II)$$

where Ph represents a phenyl group, and n represents an integer of 0 to 3, wherein the surfactant (b) is at least one surfactant selected from the group consisting of a nonionic surfactant and an anionic surfactant, wherein the nonionic surfactant is at least one compound selected from the group consisting of the following (1) to (5):

(1) polyoxyalkylene (p=1 to 40) alkyl or alkenyl ($C_{10}$ to $C_{22}$) ether, (2) polyoxyalkylene (p=1 to 40) alkyl or alkenyl ($C_{10}$ to $C_{22}$) phenyl ether;

(3) polyoxyalkylene (p=0.5 to 40) alkyl or alkenyl ($C_{10}$ to $C_{22}$) amine;

(4) polyoxyalkylene (p=0.5 to 50) alkyl or alkenyl ($C_{10}$ to $C_{22}$) amide;

(5) ethylene oxide/propylene oxide block adduct,
where p represents an average adduct molar number of alkylene oxide, and the alkylene oxide represents ethylene oxide, propylene oxide, butylene oxide, or a mixed adduct thereof, and wherein the anionic surfactant is at least one compound selected from the group consisting of the following (6) to (12):

(6) straight chain alkylbenzenesulfonate having an alkyl group of 8 to 16 carbon atoms on average, (7) alpha olefin sulfonate having 10 to 20 carbon atoms on average, (8) dialkyl sulfosuccinic acid having an alkyl group having 4 to 10 carbon atoms or an alkenyl group having 4 to 10 carbon atoms, (9) fatty acid lower alkyl ester sulfonate expressed by the following general formula (IV) or a sulfonated fatty acid compound $$R^4\text{---CHCOOY} \atop |\phantom{xxx} \atop SO_3Z \qquad (IV)$$

where $R^4$ represents an alkyl group having 8 to 20 carbon atoms or an alkenyl group having 8 to 20 carbon atoms, Y represents an alkyl group having 1 to 3 carbon atoms or an ion selected from the group consisting of alkaline metal and alkanolamine salt, and Z represents an ion selected from the group consisting of alkaline metal and alkanolamine salt,

(10) alkyl sulfate having 10 to 20 carbon atoms on average,

(11) alkyl ether sulfate having a straight chain or branched chain alkyl group or alkenyl group having 10 to 20 carbon atoms on average, to which 0.5 to 8 moles ethylene oxide on average is added, and

(12) saturated or unsaturated fatty acid salt having 10 to 22 carbon atoms on average, wherein the compound expressed by the general formula (1) is at least one compound selected from the group consisting of ethylene glycol monomethyl ether, diethylene glycol monomethyl ether, triethylene glycol monomethyl ether, ethylene glycol monopropyl ether, diethylene glycol monopropyl ether, triethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol mono-2-ethyl hexyl ether, diethylene glycol mono-2-ethyl hexyl ether, ethylene glycol monophenyl ether, diethylene glycol monophenyl ether, triethylene glycol monophenyl ether, ethylene glycol monobenzyl ether, diethylene glycol monobenzyl ether, triethylene glycol monobenzyl ether, ethylene glycol dimethyl ether, ethylene glycol diethyl ether, ethylene glycol dibutyl ether, and a glycol ether compound having 4 or more carbon atoms in total for end ether residual groups of $R^1$ and $R^2$.

2. The sheet metal deformation brightener composition according to claim 1, further comprising 0.01 to 10 wt. % of a rust preventative
wherein the rust preventative is at least one rust preventative selected from the group consisting of carboxylic acids, esters, carboxylates, amines including dialkylamine, monophosphates including polyoxyethylene dodecyl alcohol phosphate and polyoxyethylene nonyl phenol phosphate, dicyclohexylamine nitrite, and sodium nitrire.

3. The sheet metal deformation brightener composition according to claim 1, wherein a glycol portion of the glycol ether compound is formed by addition of at least one alkylene oxide selected from the group consisting of ethylene oxide and propylene oxide.

4. The sheet metal deformation brightener composition according to claim 1, wherein an adduct molar number m of the alkylene oxide is in the range of 1 to 4.

5. The sheet metal deformation brightener composition according to claim 1, wherein the nonionic surfactant is a compound expressed by the following general formula (III)

$$R^3\text{---O---}(AO)_p\text{---H} \qquad (III)$$

where $R^3$ represents an alkyl group, an alkenyl group, a phenyl group, or an alkylphenyl group, each of which has 10 to 22 carbon atoms, A represents an alkylene group having 2 to 4 carbon atoms, and p represents an average adduct molar number of alkylene oxide, a number of 1 to 40, in which the same alkylene oxide may be added alone, or a mixture of two or more types of alkylene oxide may be added.

6. The sheet metal deformation brightener composition according to claim 5, wherein polyoxyalkylene alkyl or alkenyl amine or amide is further added to the nonionic surfactant expressed by the general formula (III), and their ratio is the nonionic surfactant expressed by the general formula (III)/amine or amide=9/1 to 1/9 (by weight).

7. The sheet metal deformation brightener composition according to claim 1, wherein a ratio of the compound (a) expressed by the general formula (I) to the surfactant (b) is in the range of 1/8 to 8/1 by weight, the compound (a) expressed by the general formula (I) and the surfactant (b) are contained in the range of 1 to 80 wt. % in total, and the remaining component is water.

8. An aqueous sheet metal deformation brightener composition comprising a compound (a) expressed by the following general formula (I) and a surfactant (b)

$$R^1\text{---O---}(AO)_m\text{---}R^2 \qquad (I)$$

where $R^1$ represents a functional group expressed by the following general formula (II), A represents an alkylene group having 2 to 4 carbon atoms, m represents an average adduct molar number of alkylene oxide, a number of 1 to 20, in which the same alkylene oxide may be added alone, or in a mixture of two or more types of alkylene oxide may be added, and $R^2$ represents an alkyl group having 1 to 9 carbon atoms, an alkenyl group having 2 to 9 carbon atoms, or hydrogen $$Ph\text{---}(CH_2)_n\text{---} \qquad (II)$$

where Ph represents a phenyl group, and n represents an integer of 0 to 3.

9. The sheet metal deformation brightener composition according to claim 8, further comprising 0.01 to 10 wt. % of a rust preventative.

10. The sheet metal deformation brightener composition according to claim 8, wherein the surfactant (b) is at least one surfactant selected from the group consisting of a nonionic surfactant and an anionic surfactant.

11. The sheet metal deformation brightener composition according to claim 10, wherein the nonionic surfactant is at least one compound selected from the group consisting of the following (1) to (5):

(1) polyoxyalkylene (p=1 to 40) alkyl or alkenyl ($C_{10}$ to $C_{22}$) ether, (2) polyoxyalkylene (p=1 to 40) alkyl or alkenyl ($C_{10}$ to $C_{22}$) phenyl ether;

(3) polyoxyalkylene (p=0.5 to 40) alkyl or alkenyl ($C_{10}$ to $C_{22}$) amine;

(4) polyoxyalkylene (p=0.5 to 50) alkyl or alkenyl ($C_{10}$ to $C_{22}$) amide;

(5) ethylene oxide/propylene oxide block adduct, where p represents an average adduct molar number of alkylene oxide, and the alkylene oxide represents ethylene oxide, propylene oxide, butylene oxide, or a mixed adduct thereof.

12. The sheet metal deformation brightener composition according to claim 10, wherein the nonionic surfactant is a compound expressed by the following general formula (III)

$$R^3\text{—}O\text{—}(AO)_p\text{—}H \qquad (III)$$

where $R^3$ represents an alkyl group, an alkenyl group, a phenyl group, or an alkylphenyl group, each of which has 10 to 22 carbon atoms, A represents an alkylene group having 2 to 4 carbon atoms, and p represents an average adduct molar number of alkylene oxide, a number of 1 to 40, in which the same alkylene oxide may be added alone, or a mixture of two or more types of alkylene oxide may be added.

13. The sheet metal deformation brightener composition according to claim 12, wherein polyoxyalkylene alkyl or alkenyl amine or amide is further added to the nonionic surfactant expressed by the general formula (III), and a ratio between the nonionic surfactant of general formula (III) and the amine or amide added ranges from 9/1 to 1/9 by weight.

14. The sheet metal deformation brightener composition according to claim 10, wherein the anionic surfactant is at least one compound selected from the group consisting of the following (1) to (7):

(1) straight chain alkylbenzenesulfonate having an alkyl group of 8 to 16 carbon atoms on average, (2) alpha olefin sulfonate having 10 to 20 carbon atoms on average, (3) dialkyl sulfosuccinic acid having an alkyl group having 4 to 10 carbon atoms or an alkenyl group having 4 to 10 carbon atoms, (4) fatty acid lower alkyl ester sulfonate expressed by the following general formula (IV) or a sulfonated fatty acid compound $$R^4\text{—}\underset{SO_3Z}{\underset{|}{CHCOOY}} \qquad (IV)$$

where $R^4$ represents an alkyl group having 8 to 20 carbon atoms or an alkenyl group having 8 to 20 carbon atoms, Y represents an alkyl group having 1 to 3 carbon atoms or an ion selected from the group consisting of alkaline metal and alkanolamine salt, and Z represents an ion selected from the group consisting of alkaline metal and alkanolamine salt, (5) alkyl sulfate having 10 to 20 carbon atoms on average, (6) alkyl ether sulfate having a straight chain or branched chain alkyl group or alkenyl group having 10 to 20 carbon atoms on average, to which 0.5 to 8 moles ethylene oxide on average is added, and (7) saturated or unsaturated fatty acid salt having 10 to 22 carbon atoms on average.

15. The sheet metal deformation brightener composition according to claim 8, wherein a ratio of the compound (a) expressed by the general formula (I) to the surfactant (b) is in the range of 1/8 to 8/1 by weight, the compound (a) expressed by the general formula (I) and the surfactant (b) are contained in the range of 1 to 80 wt. % in total, and the remaining component is water.

16. The sheet metal deformation brightener composition according to claim 9, wherein the rust preventative is at least one rust preventative selected from the group consisting of carboxylic acids, esters, carboxylates, amines including dialkylamine, monophosphates including polyoxyethylene dodecyl alcohol phosphate and polyoxyethylene nonyl phenol phosphate, dicyclohexylamine nitrite, and sodium nitrite.

* * * * *